US012801338B2

(12) United States Patent
Huang

(10) Patent No.: US 12,801,338 B2
(45) Date of Patent: Nov. 17, 2026

(54) TURNTABLE DRIVING DEVICE

(71) Applicant: YA HORNG ELECTRONIC CO., LTD., Tainan City (TW)

(72) Inventor: Jin-Yi Huang, Tainan City (TW)

(73) Assignee: YA HORNG ELECTRONIC CO., LTD., Tainan City (TW)

( * ) Notice: Subject to any disclaimer, the term of this patent is extended or adjusted under 35 U.S.C. 154(b) by 257 days.

(21) Appl. No.: 18/600,065

(22) Filed: Mar. 8, 2024

(65) Prior Publication Data

US 2025/0284451 A1 Sep. 11, 2025

(51) Int. Cl.

*G06F 3/16* (2006.01)
*G06F 3/0362* (2013.01)
*H02K 21/22* (2006.01)

(52) U.S. Cl.

CPC ............ *G06F 3/165* (2013.01); *G06F 3/0362* (2013.01); *H02K 21/22* (2013.01)

(58) Field of Classification Search

CPC ........ G06F 3/165; G06F 3/0362; H02K 21/22
See application file for complete search history.

(56) References Cited

U.S. PATENT DOCUMENTS

2006/0232553 A1* 10/2006 Wong ....................... G06F 1/169 345/156
2011/0013498 A1* 1/2011 Onizuka ................ G11B 19/02
2022/0350423 A1* 11/2022 Sasaki .................... G06F 3/0362
2024/0048793 A1* 2/2024 Cremer .............. H04N 21/4394
2025/0053252 A1* 2/2025 Hashimoto ............ G11B 33/10

* cited by examiner

*Primary Examiner* — Phung-Hoang J Nguyen
(74) *Attorney, Agent, or Firm* — MUNCY, GEISSLER, OLDS & LOWE, P.C.

(57) ABSTRACT

A turntable driving device is electrically connected to an audio player and includes a base seat disposed on the audio player, a hollowed cylinder connected fixedly to the base seat, a rotating disc module including a driving unit and a rotatable plate, an axial bearing disposed between the base seat and the driving unit, and a jog wheel module rotatably sleeved on a top portion of the cylinder. The driving unit is sleeved rotatably on a bottom portion of the cylinder, and the rotatable plate is mounted to and driven by the driving unit to rotate. The jog wheel module is operable to change between a co-movable state, where the jog wheel module is co-rotatable with the rotatable plate, and a non-co-movable state, where the jog wheel module is rotatable relative to the rotatable plate.

9 Claims, 10 Drawing Sheets

TURNTABLE DRIVING DEVICE

FIELD

The disclosure relates to a driving device, and more particularly to a turntable driving device for an audio player.

BACKGROUND

Generally, in order to provide a particular atmosphere suitable for a particular occasion, for example, to create a lively atmosphere at a party, a disc jockey (DJ) moves by hand a vinyl record back and forth to control rotation of the vinyl record, thereby adjusting a playback speed of music or repeating a certain phrase of music to generate a special sound effect. Moreover, volume of music may also be adjusted to facilitate creation of a lively atmosphere.

In nowadays, music is usually stored in a digital form in an audio file that is stored in a machine readable medium, and an audio player capable of accessing and playing the audio file stored in the machine readable medium is connected thereto to play music. For example, the audio player is electrically connected to a mobile phone or a hard disk to read the audio file stored therein to thereby play music.

SUMMARY

Therefore, an object of the disclosure is to provide a turntable driving device that can emulate a feedback similar to scratching a vinyl record.

According to the disclosure, a turntable driving device is provided. The turntable driving device is adapted to be electrically connected to an audio player that is accessible to a machine readable storage medium storing a music information therein and that is for playing the music information. The turntable driving device includes a base seat, a cylinder, a rotating disc module, an axial bearing, and a jog wheel module. The base seat is adapted to be disposed on the audio player. The cylinder is hollowed and is connected fixedly to the base seat. The rotating disc module includes a driving unit sleeved rotatably on a bottom portion of the cylinder, and a rotatable plate mounted to and driven by the driving unit to rotate. The axial bearing is disposed between the base seat and the driving unit. The jog wheel module is rotatably sleeved on a top portion of the cylinder, and is operable to change between a co-movable state, where the jog wheel module is co-rotatable with the rotatable plate, and a non-co-movable state, where the jog wheel module is rotatable relative to the rotatable plate.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
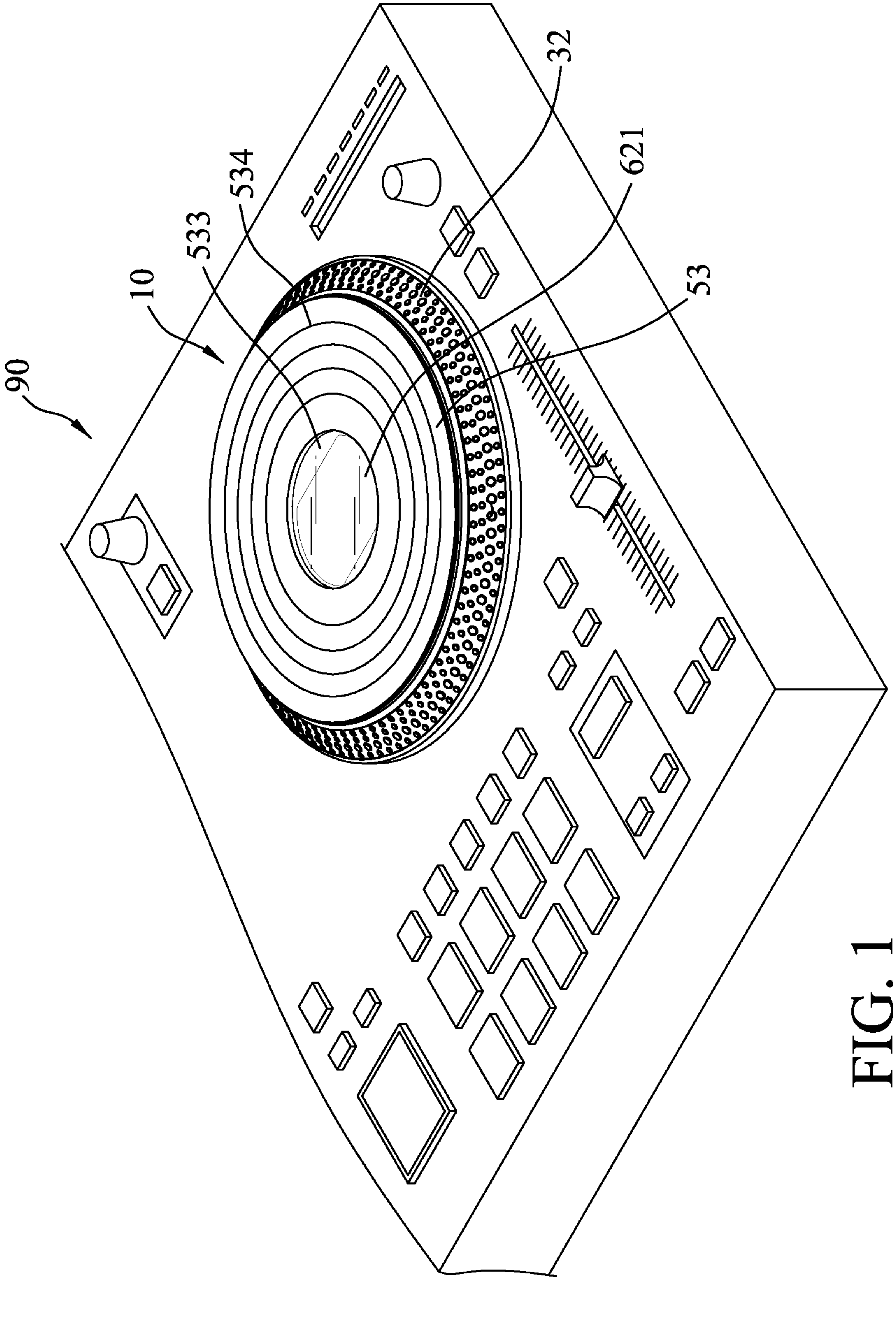
FIG. 1 is a perspective view of a turntable driving device of an embodiment according to the present disclosure adapted to be mounted to an audio player.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 2:
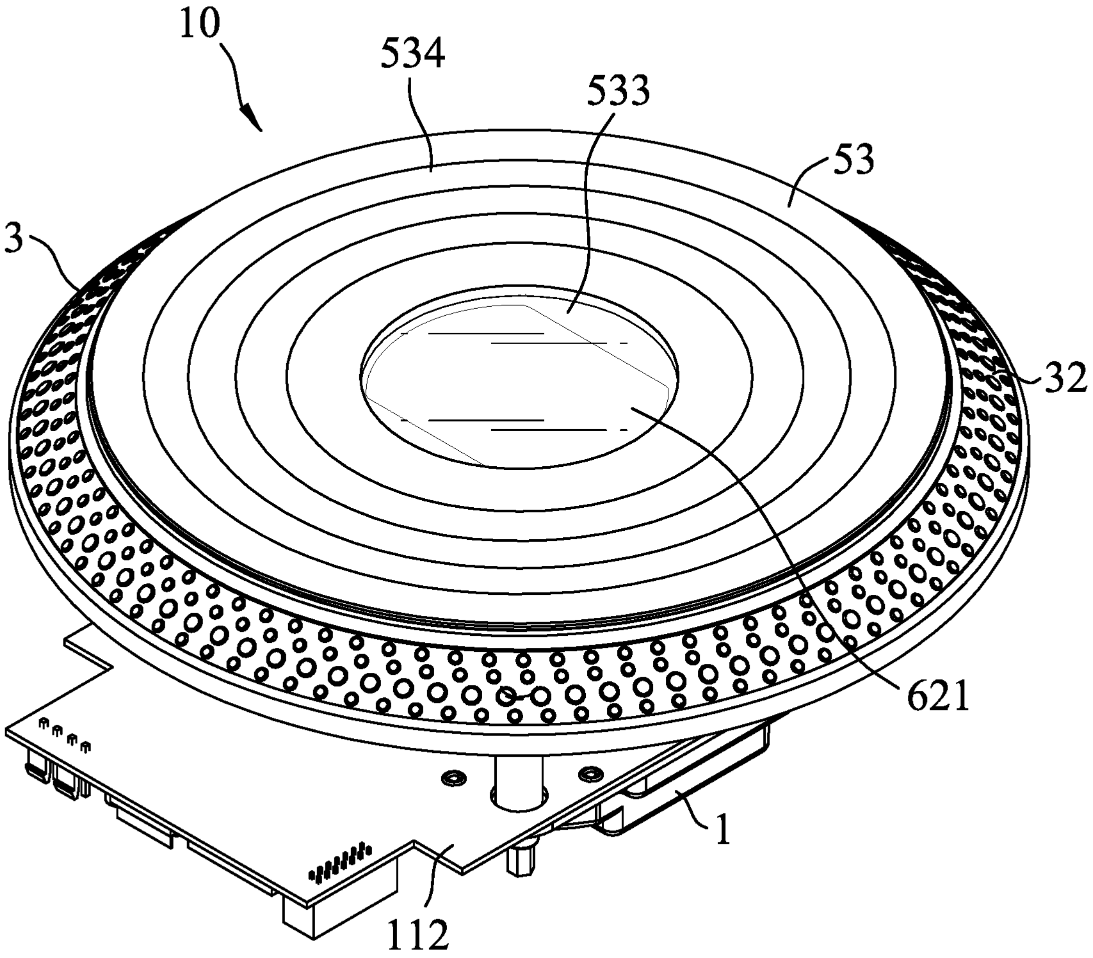
FIG. 2 is a perspective view of the turntable driving device of the embodiment.
Figure 3:
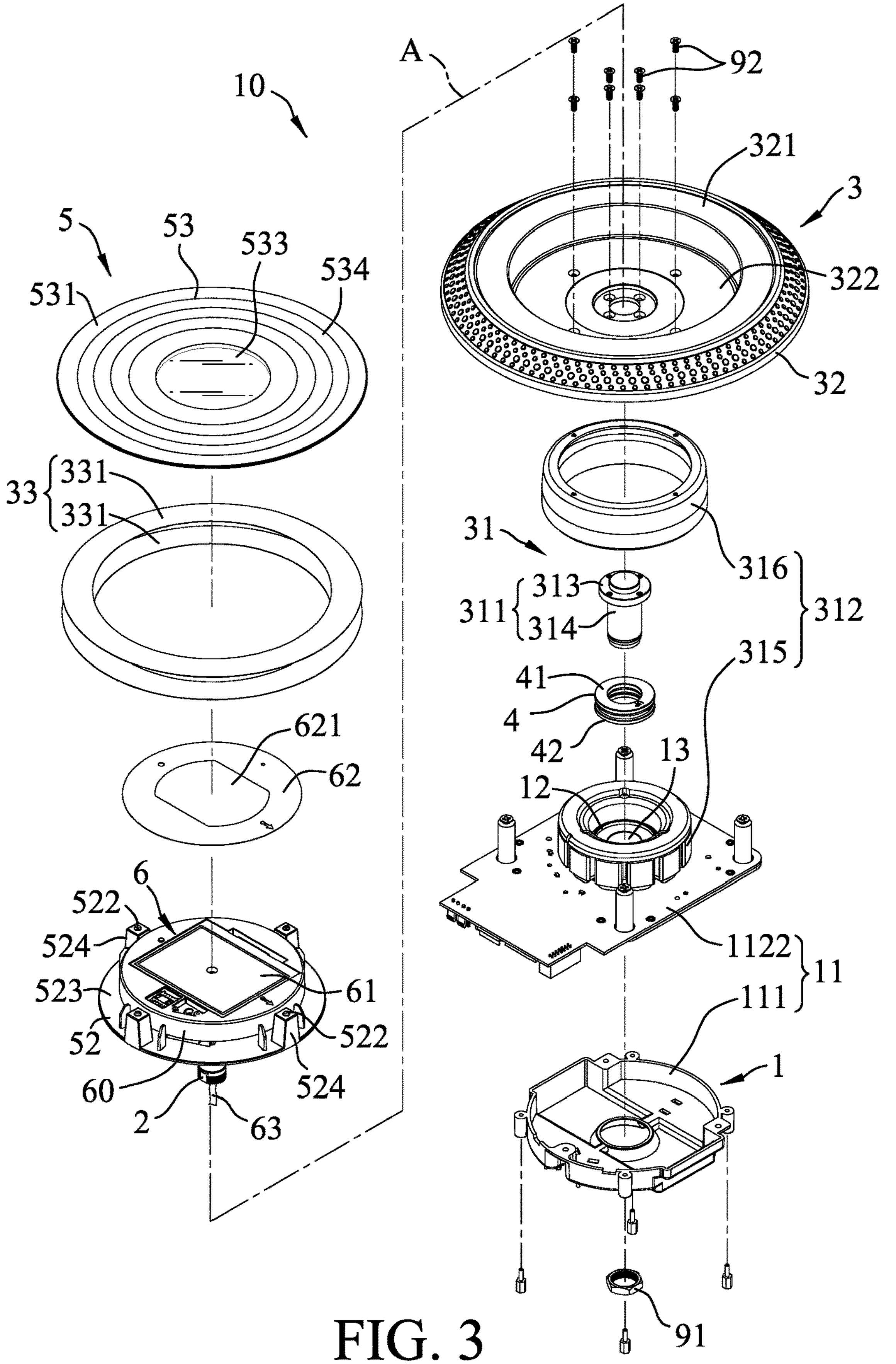
FIG. 3 is a partly exploded perspective view of the embodiment.

Referring to FIGS. 1 to 3, a turntable driving device 10 of an embodiment according to the present disclosure is adapted to be electrically connected to an audio player 90. The audio player 90 is accessible to a machine readable storage medium (not shown) that stores a music information therein and is for playing the music information. It should be noted that the music information may be stored in another external storage device (not shown) that is signally connected to the audio player 90, and the external storage device is, for example, a handheld electronic device or a flash drive.

Figure 4:
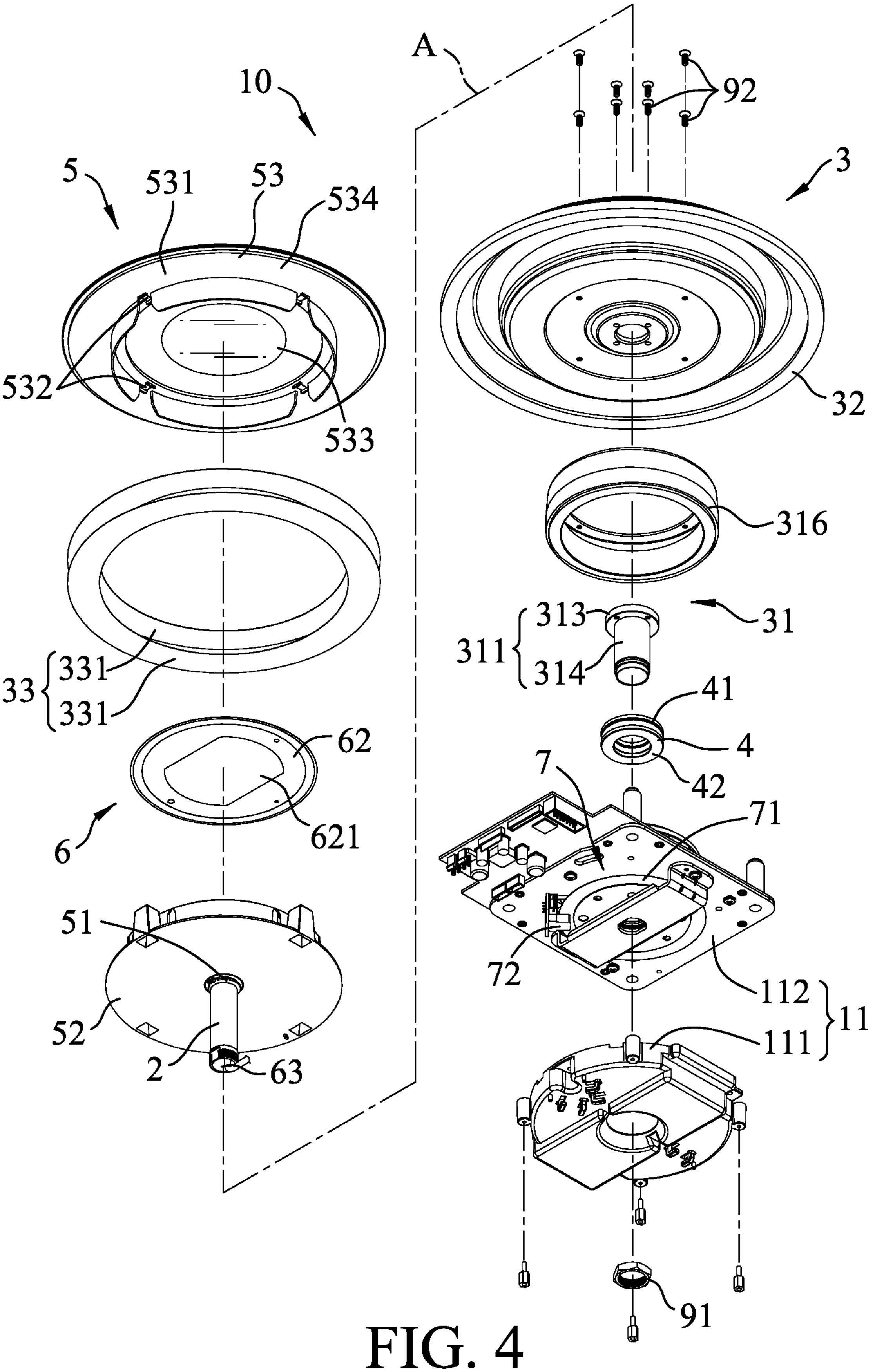
FIG. 4 is a partly exploded perspective view of the embodiment from another view of angle different from FIG. 3.
Figure 5:
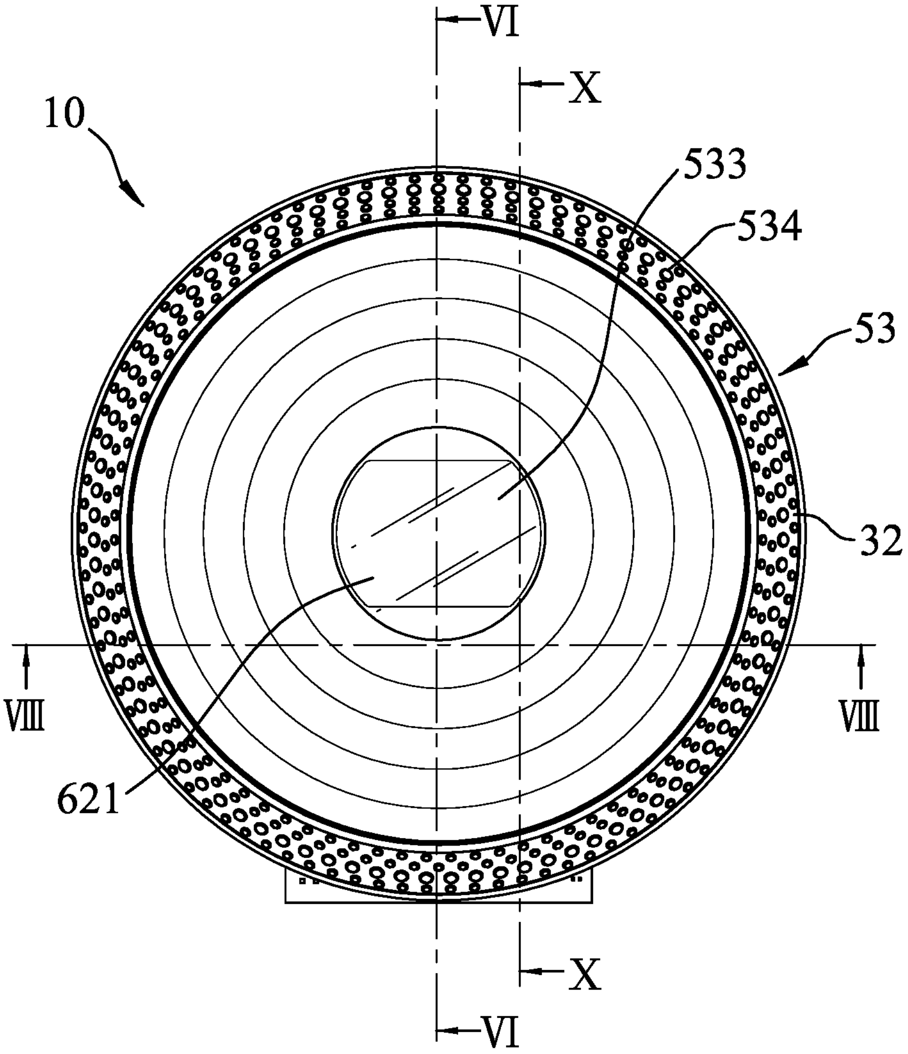
FIG. 5 is a top view of the embodiment.
Figure 7:
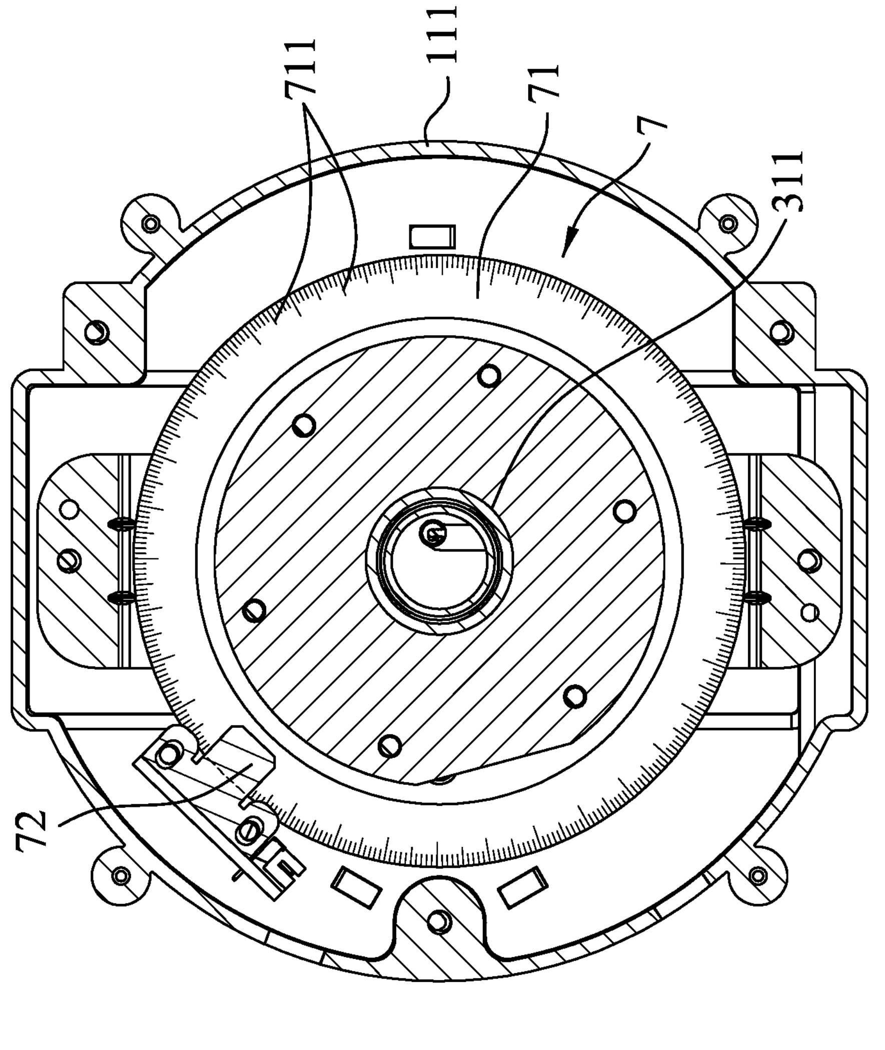
FIG. 7 is a cross-sectional view of the embodiment, illustrating a rotatable plate sensing module of the turntable driving device.
Figure 8:
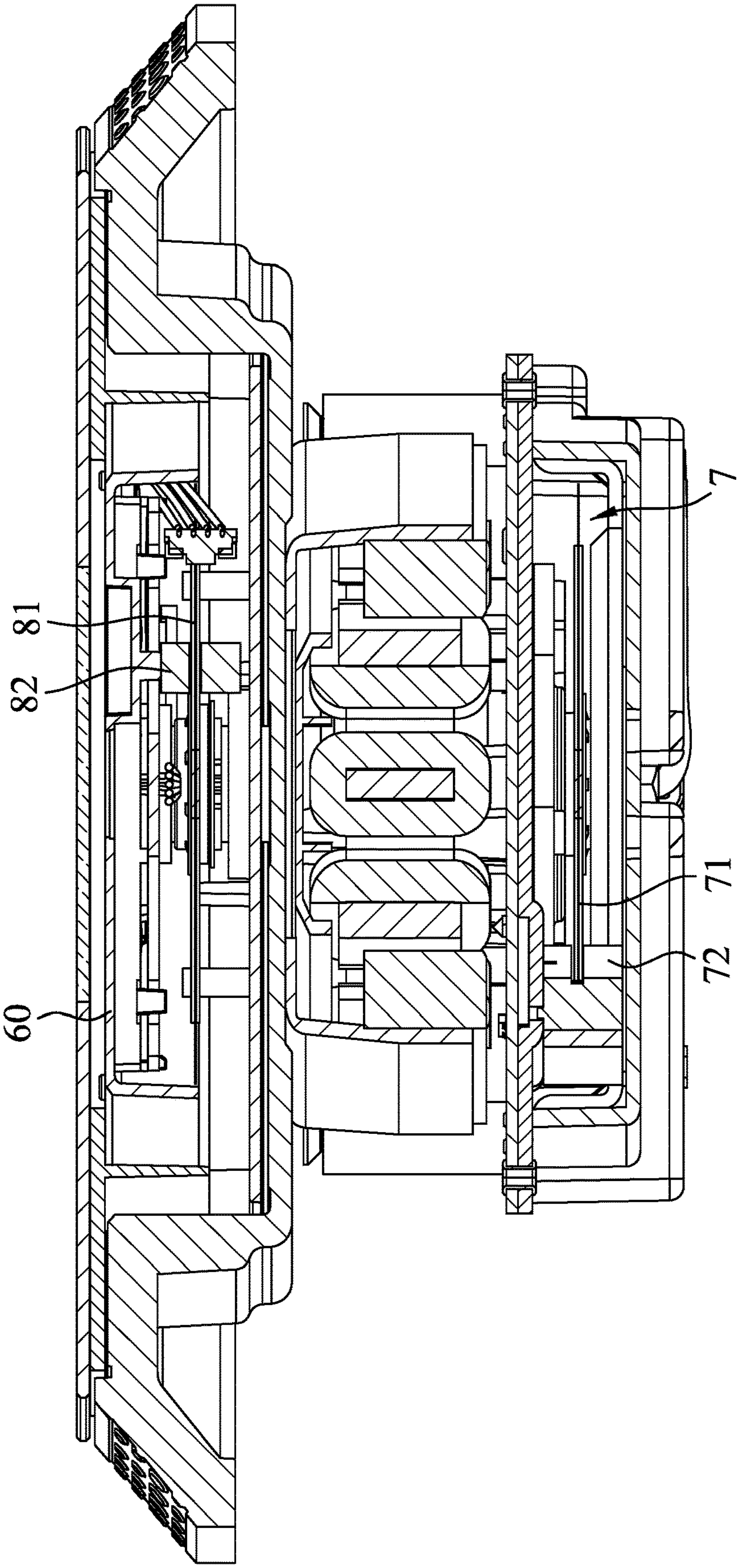
FIG. 8 is a sectional view taken along line VIII-VIII in FIG. 5.
Figure 9:
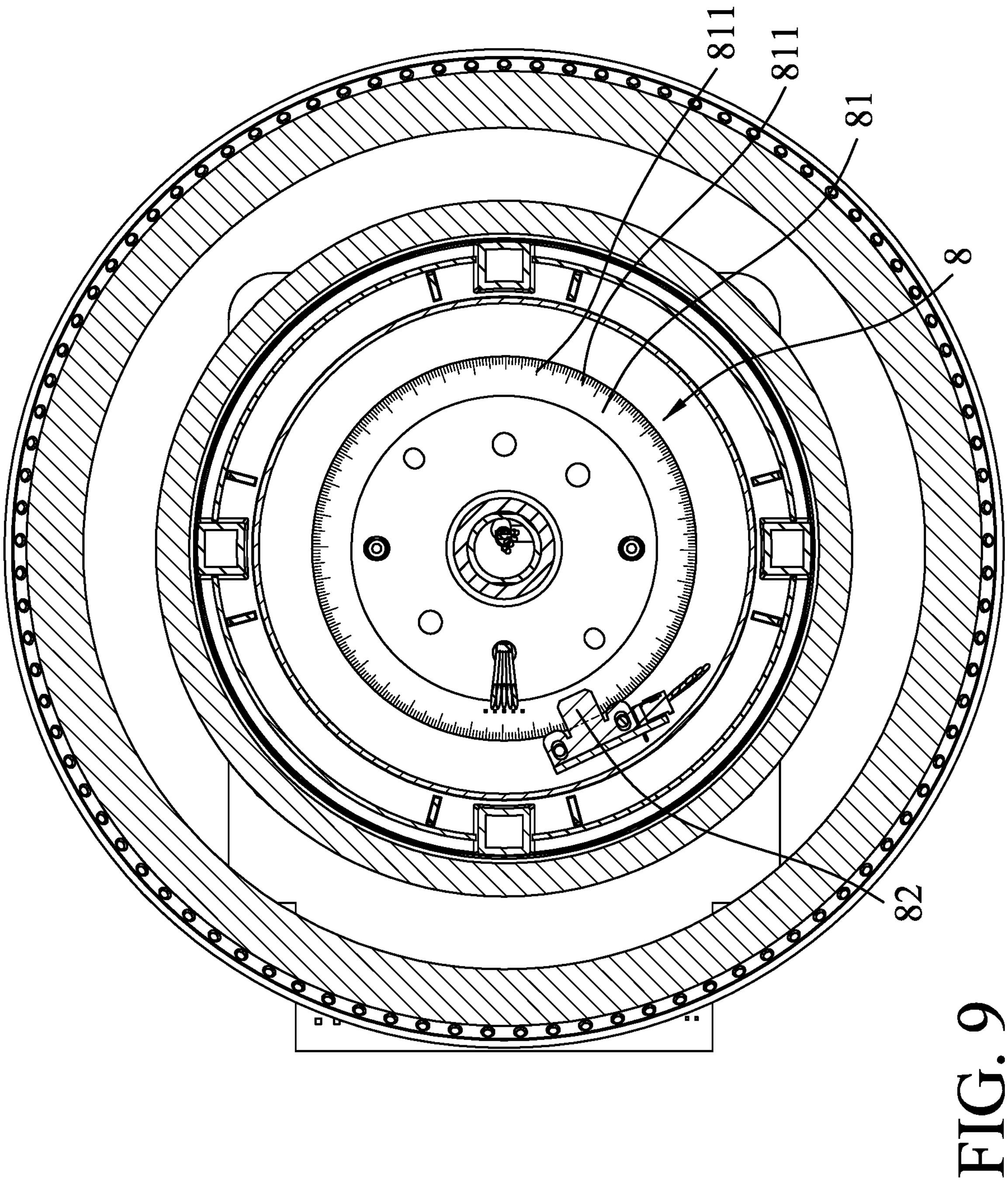
FIG. 9 is a cross-sectional view of the embodiment, illustrating a jog wheel sensing module of the turntable driving device.
Figure 10:
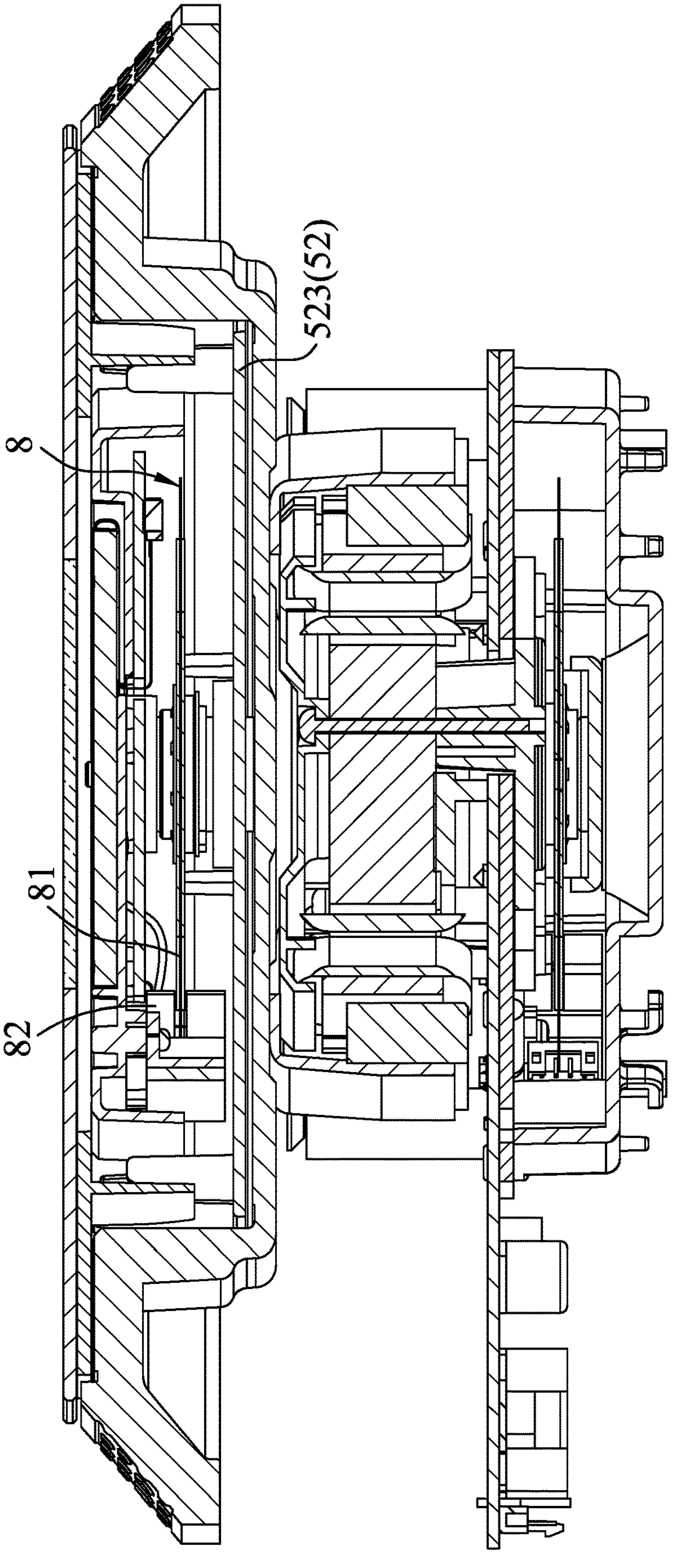
FIG. 10 is a sectional view taken along line X-X in FIG. 5.

Referring to FIGS. 2 to 4, the turntable driving device 10 includes a base seat 1, a cylinder 2, a rotating disc module 3, an axial bearing 4, a jog wheel module 5, a display module 6, a rotatable plate sensing module 7 (see FIG. 7), and a jog wheel sensing module 8 (see FIG. 9). The cylinder 2 extends vertically in an axial direction (A) and is connected fixedly to the base seat 1. The rotating disc module 3 is sleeved on the cylinder 2. The axial bearing 4 is disposed between the base seat 1 and the rotating disc module 3. The jog wheel module 5 is rotatably sleeved on a top portion of the cylinder 2.

Referring to FIGS. 1, 3, 4 and 6, the base seat 1 is adapted to be disposed on the audio player 90, and includes a base portion 11 and a protruding portion 12 extending upwardly from the base portion 11 in the axial direction (A), and is formed with a through hole 13 extending vertically through the protruding portion 12 in the axial direction (A). The cylinder 2 is hollowed, is inserted into the through hole 13 of the base seat 1, and is fixed to a bottom surface of the base seat 1 by a hexagonal nut 91. In this embodiment, the base portion 11 includes a seat body 111, and a circuit board 112 disposed on the seat body 111 and signally connected to the audio player 90 (see FIG. 1). It should be noted that the circuit board 112 may be integrated with a printed circuit board (not shown) of the audio player 90 or may be signally connected to the audio player 90 via a transmission line according to practical application requirements.

The rotating disc module 3 includes a driving unit 31 sleeved rotatably on the cylinder 2, a rotatable plate 32 mounted to and driven by the driving unit 31 to rotate, and a wear-resistant set 33.

The driving unit 31 includes a first rotating shaft 311 rotatably sleeved on a bottom portion of the cylinder 2, and a motor 312 mounted under the rotatable plate 32 and surrounding the first rotating shaft 311. The rotatable plate 32 is mounted coaxially to and connected fixedly to the first rotating shaft 311 and is connected to and driven by the motor 312 to rotate so as to drive rotation of the first rotating shaft 311. The first rotating shaft 311 includes a head portion 313 rotatably sleeved on and radially spaced apart from the cylinder 2, and an extension portion 314 integrally and downwardly extending from the head portion 313 in the axial direction (A) and sleeved on the cylinder 2. The extension portion 314 has an outer diameter smaller than an outer diameter of the head portion 313 in a radial direction perpendicular to the axial direction (A).

The motor 312 is adapted to be electrically connected to the audio player 90, and includes a stator 315 connected fixedly to the base seat 1 and surrounding an outer peripheral surface of the first rotating shaft 311, and a rotor sleeve 316 surrounding and spaced apart from an outer peripheral surface of the stator 315, and rotating about the stator 315 when the stator 315 is energized by a power supply, e.g., an alternating current. In this embodiment, the stator 315 is a coil assembly, and the rotor sleeve 316 is a magnet assembly and the present disclosure is not limited in this respect.

The rotatable plate 32 has an annular top surface 321, and a circular groove 322 indented downwardly from an inner periphery of the annular top surface 321. The rotatable plate 32 is fixedly connected to top portions respectively of the rotor sleeve 316 and the first rotating shaft 311 by a plurality of fasteners 92, e.g., but not limited to, bolts. In this way, the rotor sleeve 316 drives rotations of the rotatable plate 32 and the first rotating shaft 311 when being rotated.

The wear-resistant set 33 includes two wear-resistant pads 331 that are annular and that are stacked on the annular top surface 321 of the rotatable plate 32. In this embodiment, each of the wear-resistant pads 331 is made of polyester film but not limited in this respect.

The axial bearing 4 is sleeved directly on and surrounds the extension portion 314 of the first rotating shaft 311, and is clamped between a top portion of the protruding portion 12 of the base seat 1 and a bottom portion of the head portion 313 of the first rotating shaft 311 in the axial direction (A). The axial bearing 4 has a rotating surface 41 in contact with the head portion 313 of the first rotating shaft 311, and a fixed surface 42 in contact with the protruding portion 12 of the base seat 1. By virtue of the axial bearing 4 that distributes weights of components of the turntable driving device 10 in an upright direction, i.e., the axial direction (A), the rotating disc module 3 may be smoothly rotated relative to the base seat 1 so as to prevent the rotatable plate 32 from wobbling or inclining relative to the base seat 1.

Figure 6:
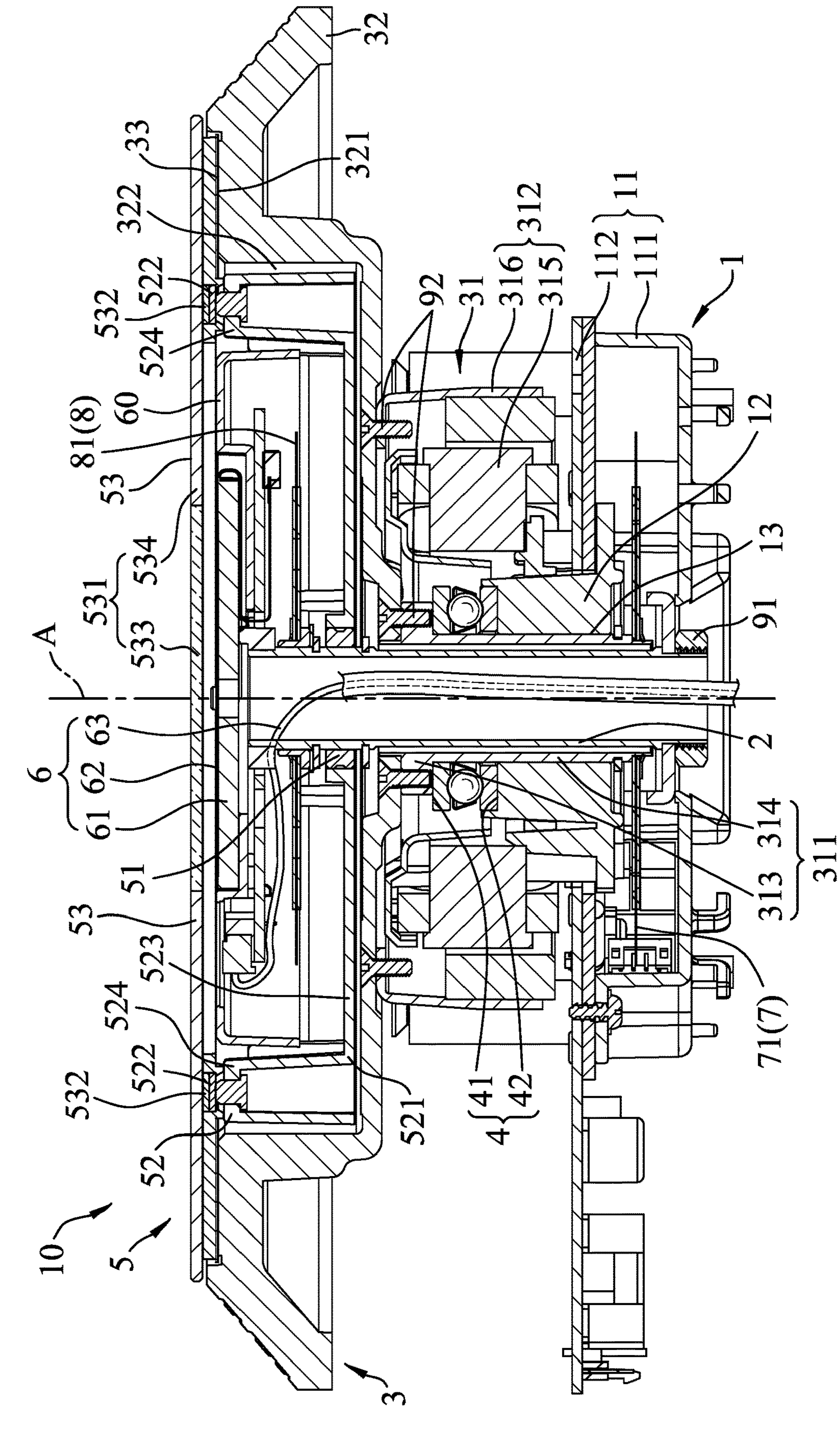
FIG. 6 is a sectional view taken along line VI-VI in FIG. 5.

As shown in FIG. 6, the jog wheel module 5 includes a second rotating shaft 51 rotatably sleeved on the top portion of the cylinder 2, a lower seat 52 sleeved on an outer periphery of the second rotating shaft 51 and connected fixedly to and co-movably with the second rotating shaft 51, and a scratchable disc unit 53 detachably and magnetically connected to a top portion of the lower seat 52.

Specifically, the second rotating shaft 51 is spaced apart from and disposed above the first rotating shaft 311. The lower seat 52 includes a lower seat body 521 connected fixedly to the second rotating shaft 51, and a plurality of first magnetic members 522 disposed on the lower seat body 521. The lower seat body 521 has a bottom seat portion 523 and a plurality of connecting posts 524 extending upwardly from an outer periphery of the bottom seat portion 523 and angularly spaced-apart from each other. The first magnetic members 522 are disposed on top portions respectively of the top connecting posts 524, respectively.

The scratchable disc unit 53 includes a turntable body 531 disposed above the lower seat 52, and a plurality of second magnetic members 532 disposed on the turntable body 531. The turntable body 531 has a transparent central region 533 that is light transmissive and a surrounding disc region 534 that extends radially and outwardly from the transparent central region 533. The second magnetic members 532 are connected fixedly to a bottom side of the surrounding disc region 534 and are detachably and magnetically connected to the first magnetic members 522, respectively. The wear-resistant pads 331 of the wear-resistant set 33 are sandwiched between the annular top surface 321 of the rotatable plate 32 and a bottom surface of the surrounding disc region 534 so as to facilitate rotation of the scratchable disc unit 53 relative to the rotatable plate 32.

The jog wheel module 5 is operable to change between a co-movable state and a non-co-movable state.

Specifically, the jog wheel module 5 is co-rotatable with the rotatable plate 32 that is driven to rotate by the driving unit 31 when being in the co-movable state as a result of frictional force formed therebetween. The jog wheel module 5 is rotatable relative to the rotatable plate 32 when being in the non-co-movable state. The wear-resistant set 33 is clamped between the rotatable plate 32 and the scratchable disc unit 53 and allows rotation of the scratchable disc unit 35 relative to the rotatable plate 32 when the jog wheel module 5 is in the co-movable state. When the scratchable disc unit 53 is moved in a direction the same as or opposite to a rotational direction of the rotatable plate 32 to an extent that the frictional force between the rotatable plate 32 and the scratchable disc unit 53 is overcome, the jog wheel module 5 is changed from the co-movable state to the non-co-movable state, and the scratchable disc unit 53 rotates independently relative to the rotatable plate 32. In other words, the jog wheel module 5 does not rotate with the rotatable plate 32, and may rotate in a speed slower than a speed of the rotatable plate 32, stop rotating, or rotate in a direction opposite to the rotational direction of the rotatable plate 32.

The display module 6 includes a mounting seat 60, a display 61 connected fixedly to the top portion of the cylinder 2, a plastic sheet 62 disposed above the display 61, and a transmission line set 63 connected signally to the display 61, extending from a lower side of the base seat 1 through the cylinder 2, and adapted to be signally connected to the audio player 90. The plastic sheet 62 has a window portion 621 corresponding in position to the transparent central region 533. The display 61 is disposed under the transparent central region 533 and the window portion 621. In this embodiment, the transmission line set 63 is a flexible flat cable detachably inserted into the circuit board 112 or a circuit board (not shown) of the audio player 90, and is signally connected to the audio player 90 and the display 61 to transceive display signals to and from the display 61.

Referring to FIGS. 1 and 6 to 8, the rotatable plate sensing module 7 is disposed in the base portion 11, and includes a first light shielding sheet 71 and a first light sensing element 72. The first light shielding sheet 71 is connected co-rotatably to the first rotating shaft 311, is configured as a transparent circular sheet, and has a plurality of angularly spaced-apart first graduations 711 marked thereon. The first light sensing element 72 is electrically connected to the circuit board 112 so as to be signally connected to the audio player 90, and is configured to detect a position of the first light shielding sheet 71 and output a first rotary information indicating a rotated information of the rotatable plate 32 based on the position of the first light shielding sheet 71. When the first light shielding sheet 71 is driven by the first rotating shaft 311 to rotate, the first light sensing element 72 detects a position of the first light shielding sheet 71 based on the first graduations 711 and outputs the first rotary information, e.g., a rotational speed, of the first light shielding sheet 71 and thus a rotational speed of the first rotating shaft 311 to the circuit board 112. In this embodiment, the first light sensing element 72 is a light blocking sensor, and may be a light reflective sensor. It should be noted that, in other embodiments, the first light sensing element 72 may be directly and electrically connected to the audio player 90.

Referring to FIGS. 1, 6, 9 and 10, the jog wheel sensing module 8 has a structure similar to that of the rotatable plate sensing module 7, is disposed on the lower seat body 521 of the lower seat 52, and includes a second light shielding sheet 81 and a second light sensing element 82. The second light shielding sheet 81 is connected co-rotatably to the lower seat 521, is configured as a transparent circular sheet, and has a plurality of angularly spaced-apart second graduations 811 marked thereon. The second light sensing element 82 is connected to the mounting seat 60 of the display module 6, is electrically connected to the circuit board 112 so as to be signally connected to the audio player 90, and is configured to detect a position of the second light shielding sheet 81 and output a second rotary information indicating a rotated information of the turntable body 531 based on the position of the second light shielding sheet 81 and thus a rotated information of the lower seat body 521. When the second light shielding sheet 81 is driven by the lower seat body 521 to rotate, the second light sensing element 82 detects a position of the second light shielding sheet 81 based on the second graduations 811 and outputs the second rotary information, e.g., a rotational speed, of the second light shielding sheet 81 to the circuit board 112. In this embodiment, the second light sensing element 82 is similar to the first light sensing element 72, so further details of the second light sensing element 82 is omitted. It should be noted that, in other embodiments, the second light sensing element 82 may be directly and electrically connected to the audio player 90.

To use the turntable driving device 10 of the present disclosure, the motor 312 is first energized to drive rotation of the rotatable plate 32, by virtue of the frictional force formed between one of the wear-resistant pads 331 and the scratchable disc unit 53 and between another one of the wear-resistant pads 331 and the rotatable plate 32, the rotatable plate 32 drives rotation of the scratchable disc unit 53. At this time, the jog wheel module 5 is in the co-movable state. Hereafter, when a user such as a disc jockey (DJ) scratches, e.g., by hand, the scratchable disc unit 53 in a direction the same as or opposite to a rotational direction of the rotatable plate 32, the scratchable disc unit 53 is driven to move with the hand of the DJ and is changed to the non-co-movable state. At this time, the rotational speeds and/or directions of the rotatable plate 32 and the scratchable disc unit 53 are different. By virtue of the wear-resistant pads 331 of the wear-resistant set 33, the user may smoothly scratch the scratchable disc unit 53 to drive the rotation of the scratchable disc unit 53 in a speed slower than that of the rotatable plate 32, so as to change the rotational direction of the scratchable disc unit 53 or stop rotation of the scratchable disc unit 53.

Thus, the scratchable disc unit 53 may be operated by the user to emulate a feedback similar to scratching a vinyl record back and forth on a turntable.

It should be noted that, by virtue of the first light sensing element 72 of the rotatable plate sensing module 7 that detects the position of the first light shielding sheet 71 and thus rotation of the rotatable plate 32 and that outputs the first rotational information to the circuit board 112 and thus to a central processing system (not shown) of the audio player 90, and by virtue of the second light sensing element 82 of the jog wheel sensing module 8 that detects the position of the second light shielding sheet 81 and thus rotation of the lower seat body 521 of the jog wheel module 5, and that outputs the second rotational information to the circuit board 112 and thus to the central processing system of the audio player 90, the central processing system of the audio player 90 processes the music information with reference to the first rotational information and the second rotational information such that the audio player 90 plays the music information processed accordingly while the motor 312 drives rotation of the rotatable plate 32 and/or the user scratches the scratchable disc unit 53. In this way, the audio player 90 plays the music information with a special sound effect, which emulates scratching a vinyl record. It should be noted that since the main feature of the present disclosure does not reside in the processing of the music information, which is well known by person skilled in the pertinent art, and further details of the same are omitted for the sake of brevity.

In summary, by virtue of the structural design of the axial bearing 4 that is coaxially disposed between the base seat 1 and the rotating disc module 3 in the axial direction (A) and that evenly distributes weights of components of the turntable driving device 10, a durability of the turntable driving device 10 may be improved, thus prolonging service life of the turntable driving device 10. Moreover, since the second rotating shaft 51 and the first rotating shaft 311 are sleeved respectively on the bottom portion and the top portion of the cylinder 2 and may be detached respectively and easily therefrom, in a case where the transmission line set 63 is a flexible flat cable having a relatively large width, the cylinder 2 may be modified to enlarge its inner diameter to permit extension of the transmission line set 63 that is to be electrically connected to the audio player 90 through the cylinder 2.

In addition, by virtue of the first magnetic members 522 and the second magnetic members 532 that are detachably and magnetically connected, the scratchable disc unit 53 may be simply detached from and connected to the lower seat 52. In this way, it is relatively convenient to assemble and disassemble the turntable driving device 100.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A turntable driving device adapted to be electrically connected to an audio player that is for playing music, said turntable driving device comprising:

a base seat that is adapted to be disposed on the audio player;

a cylinder that is hollowed and that is connected fixedly to said base seat;

a rotating disc module that includes a driving unit sleeved rotatably on a bottom portion of said cylinder, and a rotatable plate mounted to and driven by said driving unit to rotate;

an axial bearing that is disposed between said base seat and said driving unit; and a jog wheel module that is rotatably sleeved on a top portion of said cylinder, and that is operable to change between a co-movable state, where said jog wheel module is co-rotatable with said rotatable plate, and a non-co-movable state, where said jog wheel module is rotatable relative to said rotatable plate;

wherein said turntable driving device further comprises a display module that includes a display connected fixedly to said top portion of said cylinder;

wherein:

said cylinder extends in an axial direction;

said driving unit includes a first rotating shaft rotatably sleeved on said bottom portion of said cylinder, and a motor; and said rotatable plate is mounted coaxially to and connected fixedly to said first rotating shaft, and is connected to and driven by said motor to rotate so as to drive rotation of said first rotating shaft;

wherein said jog wheel module includes a second rotating shaft rotatably sleeved on said top portion of said cylinder, a lower seat fixed to said second rotating shaft, and a scratchable disc unit detachably and magnetically connected to said lower seat;

wherein said base seat includes a base portion and a protruding portion extending upwardly from said base portion in the axial direction;

wherein said first rotating shaft includes a head portion rotatably sleeved on said cylinder;

wherein said axial bearing is sleeved directly on and surrounds said first rotating shaft and is clamped between a top portion of said protruding portion of said base seat and a bottom portion of said head portion of said first rotating shaft in the axial direction; and wherein said axial bearing has a rotating surface in contact with said head portion of said first rotating shaft and a fixed surface in contact with said protruding portion of said base seat, and spaced apart from said rotating surface in the axial direction.

2. The turntable driving device as claimed in claim 1, wherein said display module further includes a transmission line set connected signally to said display, extending from a lower side of said base seat through said cylinder, and adapted to be signally connected to the audio player.

3. The turntable driving device as claimed in claim 1, wherein:

said first rotating shaft further includes an extension portion downwardly extending from said head portion in the axial direction, sleeved on said cylinder, and having an outer diameter smaller than an outer diameter of said head portion; and said axial bearing is sleeved on said extension portion.

4. The turntable driving device as claimed in claim 3, wherein said motor includes:

a stator connected fixedly to said base seat and surrounding said cylinder; and a rotor sleeve connected fixedly to said rotatable plate, surrounding and spaced apart from said stator, and rotating about said stator when said stator is energized.

5. The turntable driving device as claimed in claim 3, further comprising a rotatable plate sensing module that includes:

a first light shielding sheet connected co-rotatably to said first rotating shaft; and a first light sensing element disposed on said base seat and configured to detect a position of said first light shielding sheet and output a first rotary information indicating a rotated information of said rotatable plate based on the position of said first light shielding sheet.

6. The turntable driving device as claimed in claim 1, wherein said rotating disc module further includes a wear-resistant set clamped between said rotatable plate and said scratchable disc unit and allowing rotation of said scratchable disc unit relative to said rotatable plate when said jog wheel module is in the co-movable state.

7. The turntable driving device as claimed in claim 6, wherein:

said lower seat includes a lower seat body connected to said second rotating shaft, and a plurality of first magnetic members disposed on said lower seat body; and said scratchable disc unit includes a turntable body disposed above said lower seat, and a plurality of second magnetic members disposed on said turntable body, and detachably and magnetically connected to said first magnetic members, respectively.

8. The turntable driving device as claimed in claim 6, further comprising a jog wheel sensing module that includes:

a second light shielding sheet connected to said lower seat; and a second light sensing element connected to said display module and configured to detect a position of said second light shielding sheet and output a second rotary information indicating a rotated information of said scratchable disc unit based on the position of said second light shielding sheet.

9. The turntable driving device as claimed in claim 6, wherein:

said scratchable disc unit includes a transparent central region that is light transmissive, and a surrounding disc region that extends radially and outwardly from said transparent central region; and said turntable driving device further comprises a display module that includes a display connected fixedly to said top portion of said cylinder and disposed under said transparent central region.

* * * * *